Patented Apr. 19, 1938

2,114,286

UNITED STATES PATENT OFFICE 2,114,286

METHOD OF PURIFYING BETA-PHENYL-ETHYL ALCOHOL

Joseph W. Britton, Midland, Mich., assignor to The Dow Chemical Company, Midland, Mich., a corporation of Michigan No Drawing. Application August 19, 1936, Serial No. 96,903

11 Claims. (Cl. 260—153)

This invention concerns an improved method of purifying beta-phenylethyl alcohol, particularly phenylethyl alcohol prepared from a halobenzene and ethylene oxide by the Grignard method. Beta-phenylethyl alcohol prepared by such method contains certain impurities, particularly diphenyl, which cannot be removed satisfactorily by distillation.

In British Patent No. 398,561 of 1933, it is set forth that the beta-phenylethyl alcohol produced by the Grignard method may be purified by procedure which comprises distilling the crude reaction mixture to obtain a fraction consisting substantially of the beta-phenylethyl alcohol and diphenyl, dissolving this fraction in benzene, treating the solution at room temperature with calcium chloride to form an insoluble beta-phenylethyl alcohol-calcium chloride double compound, separating the latter and washing the same with fresh benzene, then decomposing the double compound with water, shaking the recovered alcohol with toluene, and finally distilling to recover the purified alcohol. The patent states that this purification process is accompanied by a loss of about 10 per cent, but that the recovered phenylethyl alcohol is very pure.

The above-mentioned purification method of British Patent No. 398,561 is disadvantageous not only because of the number of steps involved and the loss of alcohol incurred, but also because of certain difficulties encountered in handling the beta-phenylethyl alcohol-calcium chloride compound obtained in the process. I have dissolved a mixture of beta-phenylethyl alcohol and diphenyl in benzene and treated the solution with anhydrous calcium chloride at room temperature as specified in the patent and have found that the beta-phenylethyl alcohol-calcium chloride double compound formed by such procedure is a very fine-grained almost amorphous material which tends to clog the pores of filters and which can be washed completely free of adhering diphenyl only with extreme difficulty.

I have now discovered that by heating impure beta-phenylethyl alcohol, containing diphenyl or other impurity which does not react with calcium chloride to form an insoluble double compound, with anhydrous calcium chloride and an organic solvent to a temperature above 80° C. and then allowing the mixture to cool, the beta-phenylethyl alcohol-calcium chloride compound is obtained in the form of relatively large welldefined crystals which may readily be separated from the liquor by filtration and washed free of adhering impurities. On the basis of this discovery, I have invented the improved method of purifying beta-phenylethyl alcohol hereinafter fully described and particularly pointed out in the claims.

According to the invention, crude beta-phenylethyl alcohol, made by the known Grignard method, is purified as follows. The crude reacted mixture is distilled to obtain a mixture consisting substantially of the alcohol product and diphenyl. This mixture is heated to a temperature above 80° C., but below that at which the alcohol is appreciably decomposed, e. g., to a temperature between 85° and 150° C., with substantially anhydrous calcium chloride in the presence of sufficient inert organic liquid medium to form a thin mixture which can be stirred without difficulty. The calcium chloride is preferably employed in amount representing approximately the molecular equivalent of the alcohol, but may be used in larger proportion, if desired. It may be added before or during heating of the mixture. The organic liquid employed as a medium in the treatment is one which is non-reactive with the alcohol and calcium chloride. It is preferably one which will dissolve the alcohol and which boils at a temperature considerably higher than 80° C. at atmospheric pressure, but inert organic liquids which do not readily dissolve the alcohol and which boil at lower temperatures may be employed, though less conveniently. When mediums of low boiling point are employed, the mixture may have to be heated under pressure in order to attain a temperature above 80° C. Among the various organic liquids which may be employed as mediums for the treatment are benzene, toluene, xylene, tetrahydronaphthalene, chlorobenzene, ortho-dichlorobenzene, kerosene, etc.

During heating of the mixture a portion of the organic liquid medium is preferably, though not necessarily, distilled off in order to remove any moisture present. The mixture is then cooled, preferably with stirring, to about room temperature or below and filtered. The residue, which comprises well-defined crystals of the alcohol-calcium chloride compound, is washed with a solvent such as benzene, chlorobenzene, etc., and then treated with water to liberate the phenylethyl alcohol product. The alcohol layer of the resultant mixture is separated and distilled to obtain the purified beta-phenylethyl alcohol. By careful operation in accordance with the method just described, the beta-phenylethyl alcohol may be recovered nearly quantitatively and as the pure compound.

The following example describes one way in which the principle of the invention has been applied, but is not to be construed as limiting the invention.

*Example*

Crude beta-phenylethyl alcohol, prepared by reacting magnesium with chlorobenzene to form phenyl magnesium chloride and subsequently reacting the latter with ethylene oxide and water as described in the hereinbefore mentioned British Patent No. 398,561, was distilled to obtain a mixture containing approximately 90 per cent by weight of beta-phenylethyl alcohol and about 10 per cent of diphenyl. One part by weight of such beta-phenylethyl alcohol and diphenyl mixture was dissolved in 7 parts of chlorobenzene, 1 part of anhydrous calcium chloride powder was added, and the mixture was heated with stirring to its boiling point. Chlorobenzene was distilled from the mixture at atmospheric pressue until the material distilling was free of water. The mixture was then cooled to room temperature with continued stirring, filtered, and the residue was washed free of adhering diphenyl with fresh chlorobenzene. The residue was then treated with approximately 5 parts of water, whereby it decomposed with formation of an aqueous calcium chloride layer and a beta-phenylethyl alcohol layer. The layers were separated and the aqueous layer was steam distilled to remove dissolved beta-phenylethyl alcohol which was added to the alcohol layer. The latter was then fractionally distilled, whereby approximately 0.85 part by weight of pure beta-phenylethyl alcohol was obtained. Approximately 95 per cent of the alcohol subjected to the treatment was recovered as the pure compound.

The invention is not limited to the separation of beta-phenylethyl alcohol from diphenyl, but may be applied in separating said alcohol from the other impurities incident to its manufacture which are substantially unreactive with calcium chloride under the conditions employed. For instance, I have found that alpha-phenylethyl alcohol, i. e., alpha-hydroxy-ethyl-benzene, does not react with anhydrous calcium chloride to form a compound insoluble in the organic liquid medium and that a mixture of alpha- and beta-phenylethyl alcohols may be treated with calcium chloride in the presence of an inert organic medium as hereinbefore described to obtain an insoluble beta-phenylethyl alcohol-calcium chloride double compound leaving the alpha-phenylethyl alcohol unreacted. The resultant mixture may be filtered, the filtrate distilled to recover the alpha-phenylethyl alcohol in relatively pure form, and the residue decomposed with water to recover the beta-phenylethyl alcohol. Other impurities, such as certain lower alcohols, aldehydes, ketones, etc., frequently associated with beta-phenylethyl alcohol may also be separated from the latter by the present method. Insofar as I am aware, beta-phenylethyl alcohol may, by the method herein described, be freed of any impurity which does not react with calcium chloride to form an insoluble double compound.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of purifying beta-phenylethyl alcohol containing an impurity which does not react with calcium chloride to form an insoluble double compound, the steps which consist in heating the impure alcohol with substantially anhydrous calcium chloride to a temperature above about 80° C. in the presence of an inert organic liquid diluent and then permitting the mixture to cool.

2. In a method of purifying beta-phenylethyl alcohol containing an impurity which does not react with calcium chloride to form an insoluble double compound, the steps which consist in heating the impure alcohol with at least its molecular equivalent of substantially anhydrous calcium chloride to a temperature above 80° C. in the presence of an inert non-aqueous liquid diluent and then cooling the mixture.

3. In a method of purifying beta-phenylethyl alcohol containing an impurity which does not react with calcium chloride to form an insoluble double compound, the steps which consist in heating the impure alcohol with at least its molecular equivalent of substantially anhydrous calcium chloride to a temperature between about 85° and about 150° C. in the presence of an inert non-aqueous liquid diluent, stirring the mixture while cooling to crystallize a double compound of the alcohol and calcium chloride, separating the crystals from the liquor, treating the crystals with water to liberate beta-phenylethyl alcohol therefrom, and distilling the latter.

4. In a method of purifying beta-phenylethyl alcohol containing diphenyl, the steps which consist in heating the impure alcohol with at least its molecular equivalent of substantially anhydrous calcium chloride to a temperture above 80° C. in the presence of an inert organic liquid diluent and then cooling to crystallize a double compound of said alcohol and calcium chloride.

5. In a method of purifying synthetic beta-phenylethyl alcohol prepared from a halobenzene by the Grignard method, the steps which consist in distilling the crude alcohol to separate a mixture consisting substantially of the alcohol and diphenyl, dissolving said mixture in an inert organic liquid, heating the solution with substantially anhydrous calcium chloride to a temperature above 80° C., cooling to crystallize a double compound of the alcohol and calcium chloride, separating the crystals from the liquor, and decomposing the crystals with water to liberate beta-phenylethyl alcohol therefrom.

6. In a method of purifying beta-phenylethyl alcohol containing diphenyl, the steps which consist in heating the impure alcohol with approximately its molecular equivalent of substantially anhydrous calcium chloride to a temperature between 85° and 150° C. in the presence of an inert organic liquid diluent, stirring the mixture while cooling to crystallize a double compound of the alcohol and calcium chloride, separating the crystals from the liquor, treating the crystals with water to liberate beta-phenylethyl alcohol therefrom, and distilling the latter.

7. In a method of purifying beta-phenylethyl alcohol containing diphenyl, the steps which consist in heating the impure alcohol with approximately its molecular equivalent of substantially anhydrous calcium chloride and between about 4 and about 5 times its volume of chlorobenzene to a temperature above 80° C., stirring the mixture while cooling to crystallize a double compound of the alcohol and calcium chloride, separating the crystals from the liquor, and treating the crystals with water to liberate beta-phenylethyl alcohol therefrom.

8. In a method of purifying beta-phenylethyl alcohol containing diphenyl, the steps which consist in heating the impure alcohol with approximately its molecular equivalent of substantially anhydrous calcium chloride to a temperature above 80° C. in the presence of chlorobenzene, stirring the mixture while cooling to crystallize a double compound of the alcohol and calcium chloride, separating the crystals and washing the same with an inert organic solvent and thereafter treating the crystals with water to liberate betal-phenylethyl alcohol therefrom.

9. The method which comprises heating a mixture comprising alpha- and beta-phenylethyl alcohols with substantially anhydrous calcium chloride to a temperature above 80° C. in the presence of an inert organic liquid diluent, stirring the mixture while cooling to crystallize a double compound of the beta-phenylethyl alcohol and calcium chloride, separating the crystals from the liquor, and thereafter treating the crystals with water to liberate beta-phenylethyl alcohol therefrom.

10. The method which comprises heating a mixture comprising alpha- and beta-phenylethyl alcohols with substantially anhydrous calcium chloride, in amount representing approximately the molecular equivalent of the beta-phenylethyl alcohol, to a temperature above 80° C. in the presence of an inert organic liquid diluent, stirring the mixture while cooling to crystallize a double compound of the beta-phenylethyl alcohol and calcium chloride, separating the crystals from the liquor, distilling the latter to separate alpha-phenylethyl alcohol therefrom, and treating the crystals with water to liberate the beta-phenylethyl alcohol.

11. In a method of purifying beta-phenylethyl alcohol containing an impurity which does not react with calcium chloride to form an insoluble double compound, the steps which consist in heating the impure alcohol with at least its molecular equivalent of substantially anhydrous calcium chloride to a temperature above 80° C. in the presence of an inert non-aqueous liquid diluent, distilling a portion of the diluent from the mixture, and then cooling the latter.

JOSEPH W. BRITTON.